(12) United States Patent
Kim (10) Patent No.: US 8,557,433 B2
(45) Date of Patent: Oct. 15, 2013

(54) SECONDARY BATTERY

(75) Inventor: Changseob Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 796 days.

(21) Appl. No.: 12/591,158

(22) Filed: Nov. 10, 2009

(65) Prior Publication Data

US 2010/0143789 A1 Jun. 10, 2010

(30) Foreign Application Priority Data

Dec. 5, 2008 (KR) ........................ 10-2008-0123205

(51) Int. Cl.
*H01M 2/00* (2006.01)
*H01M 2/02* (2006.01)

(52) U.S. Cl.
USPC .......................................... 429/163; 429/164

(58) Field of Classification Search
USPC ........................................................ 429/163
See application file for complete search history.

(56) References Cited

U.S. PATENT DOCUMENTS

2006/0051667 A1* 3/2006 Kim ............................... 429/184
2007/0243461 A1* 10/2007 Yamazaki et al. ............. 429/178
2008/0096096 A1* 4/2008 Komori et al. .................. 429/56

FOREIGN PATENT DOCUMENTS

| KR | 10-2001-0048267 A | 6/2001 |
|---|---|---|
| KR | 10-2006-0086022 A | 7/2006 |
| KR | 10-0696791 B1 | 3/2007 |

OTHER PUBLICATIONS

Korean Notice of Allowance issued by KIPO on Sep. 22, 2011, corresponding to Korean Application No. 10-2008-0123205 and Request for Entry attached herewith.

* cited by examiner

*Primary Examiner* — Ula C Ruddock
*Assistant Examiner* — Jacob Marks
(74) *Attorney, Agent, or Firm* — Robert B. Bushnell, Esq.

(57) ABSTRACT

Disclosed is a secondary battery that enhances the safety and reliability thereof by preventing the danger of ignition and explosion when it is compressed or damaged due to an external impact. The secondary battery includes an electrode assembly including a first electrode plate, a second electrode plate, and a separator; a can accommodating the electrode assembly; and a cap assembly covering a top opening of the can. The cap assembly includes a cap plate having a first hole at a central portion thereof and electrically connected to a first electrode tab protruding from the first electrode plate, an insulation plate located under the cap plate, a terminal plate located under the insulation plate, an electrode terminal penetrating the cap plate, the insulation plate, and the terminal plate and electrically connected to a second electrode tab protruding from the second electrode plate, and a short-circuit plate located under the cap plate. The short-circuit plate is disposed in a manner that the short-circuit plate contacts the terminal plate or the second electrode tab whenever a distorting pressure is applied to the secondary battery.

18 Claims, 7 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 5 Dec. 2008 and there duly assigned Serial No. 10-2008-0123205.

BACKGROUND OF THE INVENTION

1. Field of the Invention

The present invention relates to a battery, and more particularly, to a secondary battery including a short-circuit plate installed on the bottom surface of a cap plate.

2. Description of the Related Art

A lithium ion secondary battery includes a positive electrode plate, a negative electrode plate, an electrolyte, and a separator, and repeats charge and discharge operations during use thereof.

In order to test the safety of a lithium ion secondary battery, many safety tests such as a penetration test, a compression test, and an oven test are carried out to eliminate the danger caused by damage to the lithium ion secondary battery during use thereof.

When a lithium ion secondary battery is compressed and damaged by an external impact, it loses its function as a battery and may ignite or explode. This is caused by a short circuit generated between a negative electrode collector and a positive electrode coating portion in the battery when the battery is compressed. Therefore, there have been many studies for eliminating the danger of ignition and explosion when a lithium ion secondary battery is compressed and damaged due to an external impact.

SUMMARY OF THE INVENTION

The present invention has been made in effort to solve the above problems, and the present invention provides a secondary battery that enhances the safety and reliability thereof by preventing the danger of ignition and explosion when it is compressed or damaged by an external impact.

The present invention is not limited to the above-mentioned object, and those skilled in the art can clearly understand other unmentioned objects of the present invention.

In accordance with an aspect of the present invention, there is provided a secondary battery includes an electrode assembly having a first electrode plate, a second electrode plate, and a separator disposed between the first and the second plates, a can accommodating the electrode assembly and having a top opening on a top surface of the can, and a cap assembly covering the opening of the can. The cap assembly includes a cap plate electrically connected to a first electrode tab protruding from the first electrode plate, an insulation plate located under the cap plate, a terminal plate located under the insulation plate, an electrode terminal penetrating the cap plate, the insulation plate, and the terminal plate and electrically connected to a second electrode tab protruding from the second electrode plate, and a short-circuit plate located under the cap plate. The short-circuit plate is disposed in a manner that the short-circuit plate contacts the terminal plate or the second electrode tab whenever a distorting pressure is applied to the secondary battery.

The short-circuit plate may include a first plate contacting a bottom surface of the cap plate, a second plate connected to the first plate, a third plate connected to the second plate. The third plate may be disposed under the terminal plate, and the third plate may contact the terminal plate or the second electrode tab whenever a distorting pressure is applied to the secondary battery.

A top surface of the third plate may have a polygonal shape. A corner of the top surface of the third plate may have an acute angle.

The second plate may maintain a first distance from the terminal plate. The first distance is about 1 mm to 3 mm. The third plate may maintain a second distance from the terminal plate. The second distance is about 0.5 mm to 1.0 mm.

The short-circuit plate may be welded to the cap plate and be electrically connected to the cap plate. The short-circuit plate may contact the cap plate, and the terminal plate may contact the electrode terminal.

The short-circuit plate may be made of nickel or a nickel alloy.

The cap assembly may further include a gasket disposed inside a first hole of the cap plate. The electrode terminal penetrates the cap plate through the first hole and the gasket prevents the electrode terminal from contacting the cap plate.

According to the present invention, when an external impact or a compressive force is applied to a secondary battery, a short-circuit plate located under a cap plate makes contact with a terminal plate or an electrode tab having the opposite polarity to that of the short-circuit plate, inducing an electrical short circuit. Therefore, the energy of the secondary battery may be consumed in advance to prevent the danger of ignition and explosion, enhancing the safety and reliability of the secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Details of the following embodiments of the present invention are contained herein and in the accompanying drawings. The advantages and characteristics of the present invention and methods for achieving them will be apparent with reference to the embodiments of the present invention that will be described in detail with reference to the drawings. The same reference numerals are used throughout the specification to refer to the same or like elements.

Hereinafter, exemplary embodiments of the present invention will be described in detail with reference to the accompanying drawings. Here, the mentioned secondary battery may refer to a lithium ion battery, but the present invention is not limited thereto. In the embodiments of the present invention, it should be understood that a bare cell and a secondary battery have the same meaning.

Figure 1:
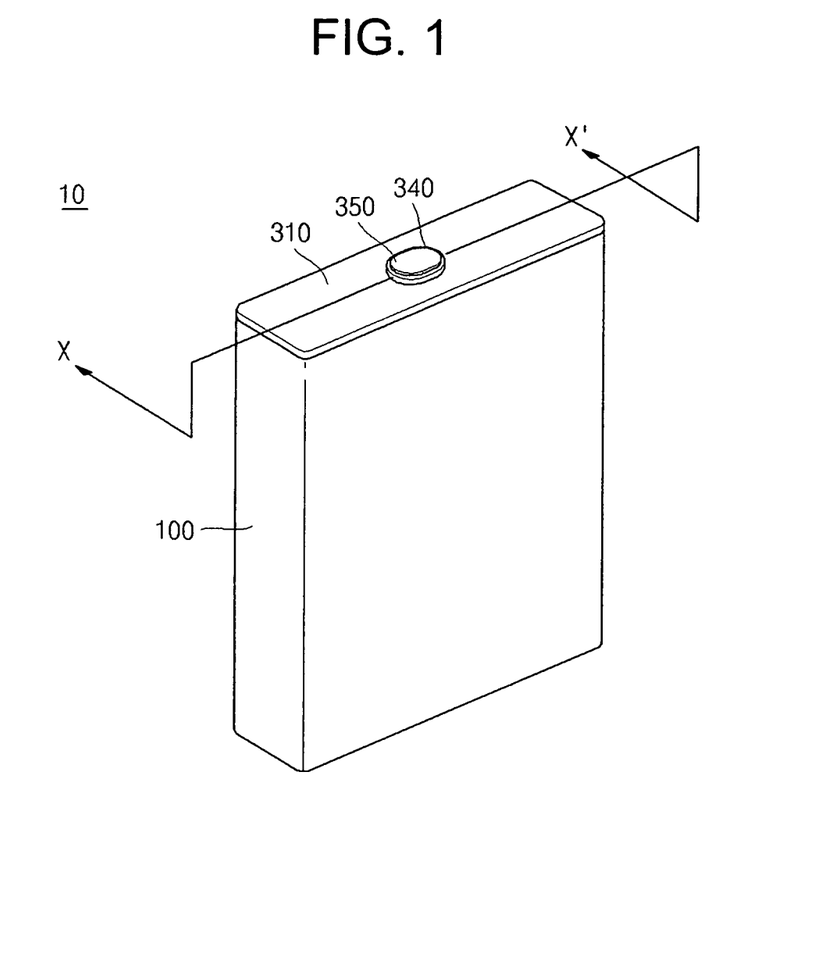
FIG. 1 is a perspective view of a secondary battery according to an embodiment of the present invention.
Figure 2:
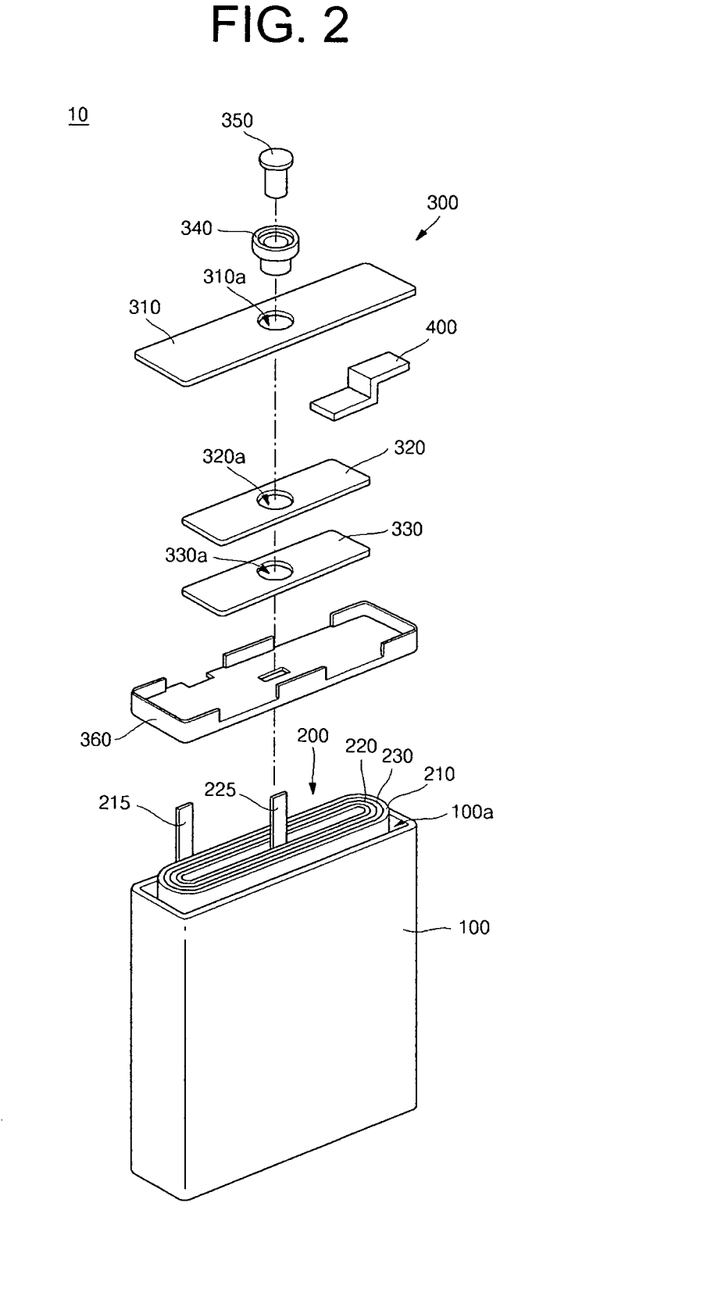
FIG. 2 is an exploded perspective view of the secondary battery according to the embodiment of the present invention.
Figure 3:
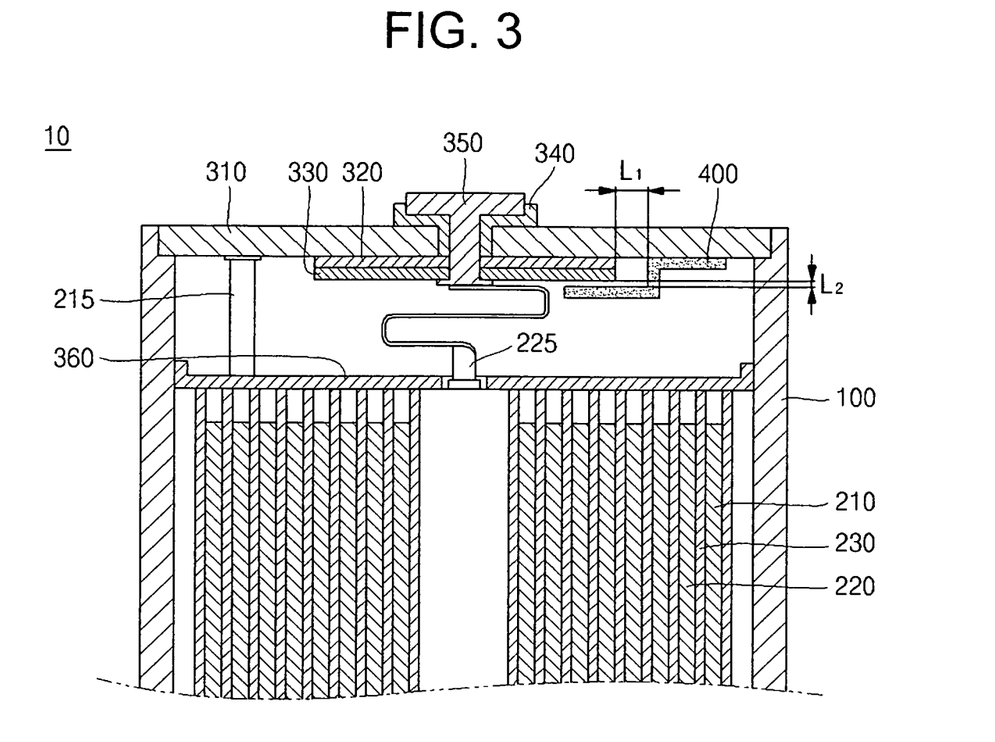
FIG. 3 is a sectional view of the secondary battery according to the embodiment of the present invention.
Figure 4:
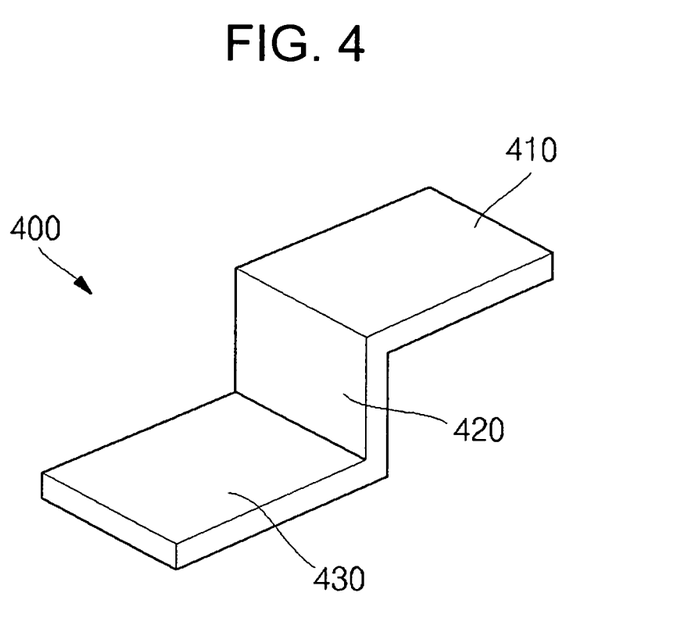
FIG. 4 is a perspective view of a short-circuit plate according to the embodiment of the present invention.

FIGS. 1 to 3 are a perspective view, an exploded perspective view, and a sectional view of a secondary battery according to an embodiment of the present invention respectively, and FIG. 4 is a perspective view of a short-circuit plate 400 according to the embodiment of the present invention.

Referring to FIGS. 1 to 3, the secondary battery according to the embodiment of the present invention includes a can 100, an electrode assembly 200 accommodated inside the can 100, and a cap assembly 300 covering an top opening 100a of the can 100. The element including the can 100, the electrode assembly 200, and the cap assembly 300 may be referred to as a bare cell 10.

The can 100 has a substantially rectangular parallelepiped shape, and has a top opening 100a at a top surface of the can 100. The can 100 may be made of a metal, and may function as a terminal by itself. The electrode assembly 200 is inserted into the can 100 through the top opening 100a.

The electrode assembly 200 includes a first electrode plate 210, a second electrode plate 220, and a separator 230. In the electrode assembly 200, the separator 230 is located between the first electrode plate 210 and the second electrode plate 220. The first electrode plate 210, the separator 230, and the second electrode plate 220 are wound so as to have a jelly-roll configuration.

The first electrode plate 210 includes a first electrode collector (not shown) and a first electrode coating portion (not shown).

When the first electrode plate 210 is the positive electrode, the first electrode collector is made of aluminum foil of high conductivity.

The first electrode coating portion is located on the first electrode collector, and includes a first electrode active material, a conductive material, and a binder. Here, the first electrode active material may be lithium cobalt oxide ($LiCoO_2$), lithium manganese oxide ($LiMn_2O_4$), or lithium nickel oxide ($LiNiO_2$). Carbon black may be used as the conductive material. The binder may be formed by dissolving and dispersing PVDF, SBR, or PTFE with a volatile solvent such as NMP, an organic solvent, or water.

The first electrode collector includes first electrode non-coating portions at the ends of the first electrode collector, in which the first electrode coating portion is not formed. A first electrode tab 215 is attached to the first electrode non-coating portion such that it protrudes toward the top opening 100a of the can 100. The first electrode tab 215 may be made of aluminum. A first insulation tape (not shown) is formed at a portion of the electrode assembly 200, around which the first electrode tab 215 is drawn, to prevent a short circuit with elements other than the can 100.

The second electrode plate 220 includes a second electrode collector (not shown) and a second electrode coating portion (not shown).

When the second electrode plate 220 is the negative electrode, the second electrode collector is made of copper foil of high conductivity.

The second electrode coating portion is located on the second electrode collector, and may include a second electrode active material, a conductive material, and a binder. Here, the second electrode active material may be a carbon material, Si, Sn, a tin oxide, a composite tin alloy, a transition metal oxide, a lithium metal nitride, or a lithium metal oxide. A carbon material is mainly used as the second electrode active material. Carbon black is used as the conductive material. The binder may be formed by dissolving and dispersing PVDF, SBR, or PTFE with a volatile solvent such as NMP, an organic solvent, or water. The second electrode plate 220 may not need to use a conductive material because the conductivity of the second electrode coating material itself is high.

The second electrode collector includes second electrode non-coating portions (not shown) at the ends of the second electrode collector, in which the second electrode coating portion is not formed. A second electrode tab 225 is attached to the second electrode non-coating portion and protrudes toward the top opening 100a of the can 100. The second electrode tab 225 may be made of copper (Cu) and nickel (Ni). A second insulation tape (not shown) is formed at a portion of the electrode assembly 200, around which the second electrode tab 225 is drawn, to prevent a short circuit with elements other than the electrode terminal 350.

Although the first electrode plate 210 is assumed to be the positive electrode and the second electrode plate 220 the negative electrode in the above description, the first electrode plate 210 may be the negative electrode and the second electrode plate 220 may be the positive electrode. In this case, the materials of the collectors and active materials would be replaced each other.

In general, in a square type secondary battery, the can 100 performing the function of a terminal is the positive electrode. In this case, when the first electrode plate 210 is the positive electrode, the outermost electrode plate of the jelly-roll type electrode assembly 200 may be the first electrode plate 210. On the other hand, when the first electrode plate 210 is the negative electrode, the outermost electrode plate of the jelly-roll type electrode assembly 200 may be the second electrode plate 220, i.e. the positive electrode.

In the following description of the embodiment of the present invention, it is assumed that the first electrode plate 210 is the positive electrode and the second electrode plate 220 is the negative electrode.

The separator 230 is formed of a porous membrane using polyethylene (PE), polypropylene (PP), or their composite film. The separator 230 interrupts electrical conduction between the first electrode plate 210 and the second electrode plate 220 of the electrode assembly 200, and enables smooth movement of lithium ions. The separator 230 prevents the first electrode plate 210 and the second electrode plate 220 from making contact with each other and also prevents the temperature of the secondary battery from increasing further through a shut-down of the secondary battery when the temperature of the secondary battery starts to increase due to an external short circuit or the like.

Ceramic layers made by mixing a ceramic material with a binder may be formed on surfaces of the first electrode plate 210 and the second electrode plate 220 to prevent a short circuit between the first electrode plate 210 and the second electrode plate 220 in addition to the separator 230. However, this is not within the spirit of the present invention, and a detailed description thereof will be omitted.

In the electrode assembly 200, lithium ions are moved from the first electrode plate 210 to the second electrode plate 220 to be intercalated thereby during a charge operation of the battery. On the other hand, lithium ions are deintercalated from the second electrode plate 220 to the first electrode plate 210 to apply a voltage to an external power source during a discharge operation of the battery.

The cap assembly 300 includes a cap plate 310, an insulation plate 320, a terminal plate 330, a gasket 340, an electrode terminal 350, and a short-circuit plate 400. The cap assembly 300 is coupled to the electrode assembly 200 at around the top opening 100a of the can 100 together with a separate insulation case 360 so as to seal the can 100.

The cap plate 310 is a metal plate having a size corresponding to the size of the top opening 100a of the can 100. A first hole 310a is formed at a central portion of the cap plate 310. An electrolyte injection hole is formed on one side of the cap plate 310, and a safety vent (not shown) is formed on one surface of the cap plate 310 on the opposite side to the electrolyte injection hole with respect to the first hole 310a. After the electrolyte is poured into the can 100, the electrolyte injection hole is sealed by a cover such as a ball. The electrolyte injection hole and the safety vent have general shapes. The cap plate 310 makes contact with the first electrode tab 215 and is electrically connected to it. Hence, the cap plate 310 has the same polarity as that of the first electrode plate 210.

The insulation plate 320 is located under the cap plate 310, and has a second hole 320a at a position corresponding to the first hole 310a. The insulation plate 320 may be made of the same insulation material as that of the gasket 340.

The terminal plate 330 is located under the insulation plate 320, and has a third hole 330a at a position corresponding to the second hole 320a. The terminal plate 330 is made of nickel or a nickel alloy.

The electrode terminal 350 penetrates the cap plate 310, the insulation plate 320, and the terminal plate 330 through the first hole 310a, the second hole 320a, and the third hole 330a. The electrode terminal 350 makes contact with the second electrode tab 225 and is electrically connected to it. Hence, the electrode terminal 350 has the same polarity as that of the second electrode plate 220. Since the electrode terminal 350 is inserted into the third hole 330a of the terminal plate 330 so as to make contact with the second electrode tab 225, the terminal plate 330 is also electrically connected to the second electrode tab 225 and has the same polarity as that of the second electrode plate 220.

The electrode terminal 350 is inserted into the first hole 310a of the cap plate 310 through the gasket 340. The gasket 340, in the first hole 310a, is located between the electrode terminal 350 and cap plate 310, and therefore the electrode terminal 350 is insulated from the cap plate 310.

The short-circuit plate 400 is located under the cap plate 310, and when the bare cell 10 is compressed by an external pressure, the short-circuit plate 400 is short-circuited with the terminal plate 330 of the cap assembly 300 or the second electrode tab 225 to consume almost all charge energy of the secondary battery. The short-circuit plate 400 will be described in detail hereinafter.

Referring to FIG. 4 together with FIG. 3, the secondary battery according to the embodiment of the present invention includes the short-circuit plate 400 located under the cap plate 310 on one side of the cap plate 310.

The short-circuit plate 400 includes a first plate 410, a third plate 430, and a second plate 420 that connects the first plate 410 to the third plate 430. The first plate 410 is located under the cap plate 310 on one side of the cap plate 310, and a third plate 430 is located under the terminal plate 330. The upper surface of the third plate 430 is spaced apart from the terminal plate 330 so as to face the terminal plate 330. The first plate 410, the second plate 420, and the third plate 430 have flat rectangular shapes, but are not limited thereto. In other words, they may have polygonal or circular shapes. The short-circuit plate 400 is made of a metal such as nickel (Ni) or a nickel alloy, copper, or aluminum.

The first plate 410 is welded to the cap plate 310 and is electrically connected to it. Hence, the first plate 410 may have the same polarity as that of the first electrode plate 210, and the second and third plates 420 and 430 electrically connected to the first plate 410 may have the same polarity as that of the first electrode plate 210.

Figure 5:
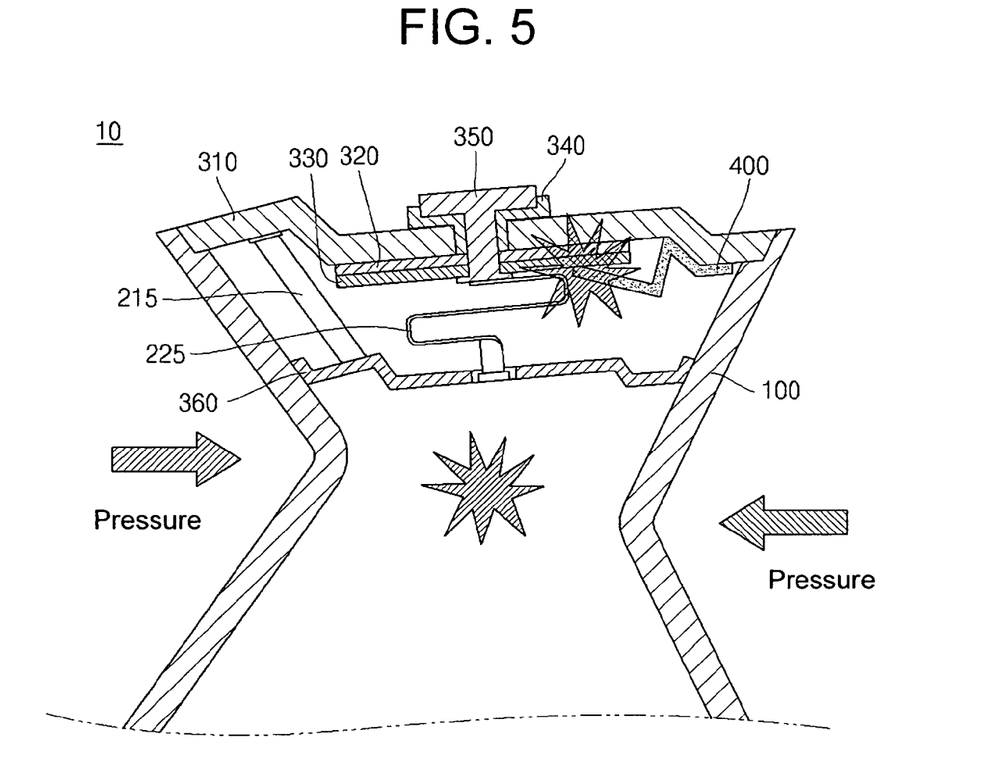
FIGS. 5 and 6 are views illustrating the function of the short-circuit plate according to the embodiment of the present invention.
Figure 6:
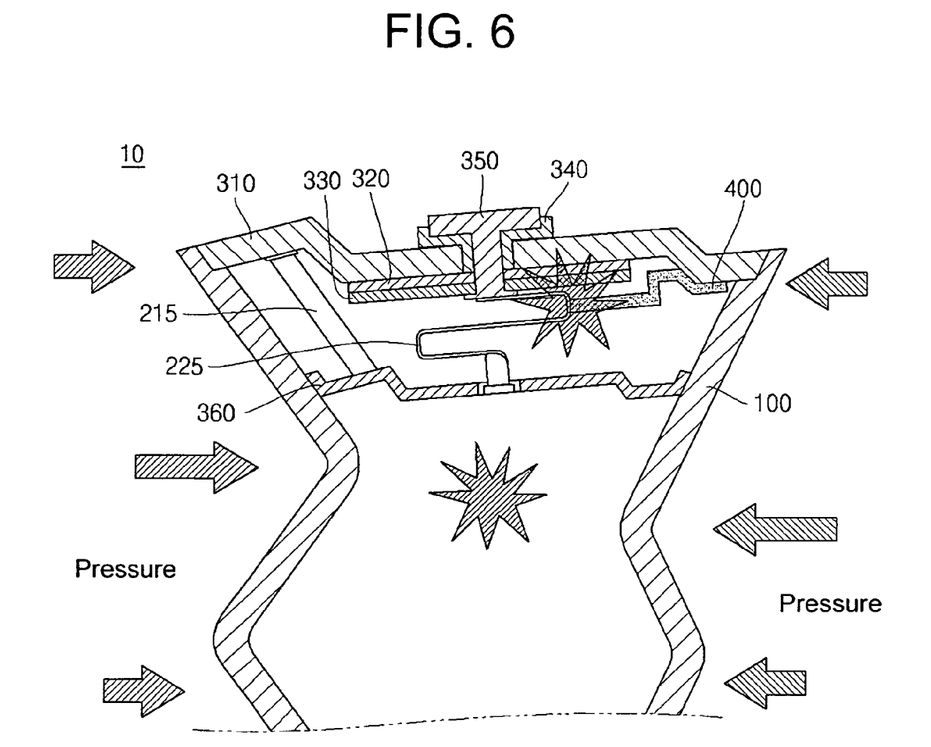

FIGS. 5 and 6 are views illustrating the function of the short-circuit plate 400 according to the embodiment of the present invention.

Referring to FIG. 5 together with FIG. 3, when the secondary battery is compressed or damaged due to a longitudinal compression test or an external impact caused by a carelessness of the user, the battery loses its function and may ignite or explode. This is caused by a short circuit between the first electrode coating layer and the second electrode collector.

As illustrated in FIG. 5, in the secondary battery according to the embodiment of the present invention, when the secondary battery is distorted by a pressure applied in the longitudinal direction of the secondary battery, the short-circuit plate 400 may contact the terminal plate 330. More particularly, the third plate 430 of the short-circuit plate 400 may contact the terminal plate 330, causing an electrical short circuit. However, the degree of compression generated in the secondary battery becomes different depending on a portion of the secondary battery to which a pressure is applied, and the degree of compression or distortion determines which portion of the short-circuit plate 400 contacts the terminal plate 330 to cause an electrical short circuit. Since the short-circuit plate 400 has the same polarity as that of the first electrode plate 210 and the terminal plate 330 has the same polarity as that of the second electrode plate 220, an electrical short circuit may be caused by them.

As mentioned above, when the secondary battery is compressed or distorted by a pressure, the terminal plate 330 and the short-circuit plate 400 make contact with each other so as to be short-circuited, consuming the power of the secondary battery. In other words, since the short-circuit plate 400 and the terminal plate 330 are made of metals, they are mutually short-circuited to emit the energy of the secondary battery in advance and thus minimizing emission of heat.

Hence, before a short circuit is caused between coating portions having the opposite polarities or between an electrode collector and coating portions, the terminal plate 330 and the short-circuit plate 400 make contact with each other to consume the power of the secondary battery, thereby remarkably reducing the possibility of ignition or explosion of the secondary battery.

In addition, even when a short circuit is caused between a collector and a coating portion having the opposite polarities in the electrode assembly 200, the terminal plate 330 and the short-circuit plate 400 may be short-circuited together. Hence, the power of the electrode assembly 200 is also consumed at a contact portion between the terminal plate 330 and the short-circuit plate 400, reducing the possibility of explosion of the secondary battery.

Here, a first distance L1 between the second plate 420 and the terminal plate 330 is 1 to 3 mm, and a second distance L2 between the third plate 430 and the terminal plate 330 is 0.5 to 1 mm. When the first distance between the second plate 420 and the terminal plate 330 is smaller than 1 mm or the second distance between the third plate 430 and the terminal plate 330 is smaller than 0.5 mm, the short-circuit plate 400 may touch the terminal plate 330 even in the case of a minor impact, making the secondary battery useless. On the other hand, when the first distance between the second plate 420 and the terminal plate 330 is larger than 3 mm or the second distance between the third plate 430 and the terminal plate 330 is larger than 1 mm, the short-circuit plate 400 may not touch the terminal plate 330 even in the case of a large external impact. In this case, since the short-circuit plate 400 and the terminal plate 330 are not short-circuited even when the first electrode coating portion and the second electrode collector are short-circuited, the internal energy of the secondary battery cannot be consumed by the short-circuit plate 400 and the terminal plate 330, making it difficult to eliminate the danger of ignition or explosion of the secondary battery.

Referring to FIG. 6, when the secondary battery is compressed by pressures applied to the upper portion in the transverse direction of the secondary battery as indicated by arrows in FIG. 6, the short-circuit plate 400 can make contact with the second electrode tab 225. More particularly, the third plate 430 of the short-circuit plate 400 may make contact with the second electrode tab 225, causing an electrical short circuit. However, the degree of compression generated in the secondary battery becomes different depending on a portion of the secondary battery to which a pressure is applied, and the degree of compression determines which portion of the short-circuit plate 400 makes contact with the second electrode tab 225 to cause an electrical short circuit. Since the short-circuit plate 400 has the same polarity as that of the first electrode plate 210 and the second electrode tab 225 has the same polarity as that of the second electrode plate 220, an electrical short circuit may be caused by them.

As mentioned above, when the secondary battery is compressed by a pressure, the second electrode tab 225 and the short-circuit plate 400 make contact with each other so as to be short-circuited, consuming the power of the secondary battery.

When the secondary battery is compressed, it is difficult to know whether the short-circuit plate 400 will make contact with the terminal plate 330 or the second electrode plate 225. The reason is that the degree of compression of the secondary battery becomes different depending on the direction and strength of a pressure and the material of the can 100. However, in general, when the secondary battery is compressed lightly, the short-circuit plate 400 is short-circuited with the terminal plate 330 close to the short-circuit plate 400, but when the secondary battery is compressed strongly, the short-circuit plate 400 may be short-circuited with at least one of the terminal plate 330 and the second electrode tab 225.

Figure 7:
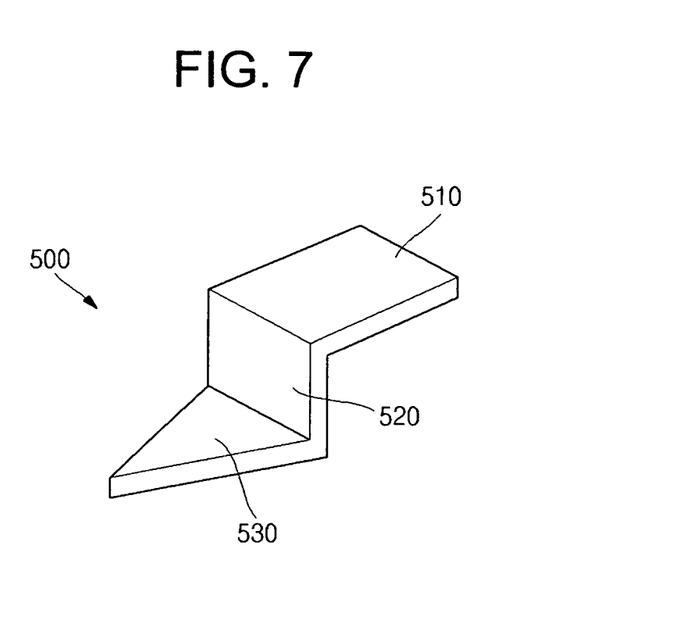
FIG. 7 is a perspective view of a short-circuit plate according to another embodiment of the present invention.

FIG. 7 is a perspective view of a short-circuit plate 500 according to another embodiment of the present invention.

Referring to FIG. 7, the short-circuit plate 500 according to the embodiment of the present invention has a different structure from the short-circuit plate 400 of FIG. 4, but has the same position, material, and function as those of the short-circuit plate 400. Therefore, the structure of the short-circuit plate 500 will be described in detail hereinafter.

The short-circuit plate 500 includes a first plate 510, a third plate 530, and a second plate 520 that connects the first plate 510 to the third plate 530. The first plate 510 is located under the cap plate 310 on one side of the cap plate 310. The third plate 530 is located under the terminal plate 330. The upper surface of the third plate 530 is spaced apart from the terminal plate 330 so as to face the terminal plate 330.

As shown in FIG. 7, a corner of the third plate 520 of the short-circuit plate 500 has an acute angle.

When a pressure is applied in the longitudinal direction of the secondary battery so as to compress the secondary battery, the short-circuit plate 500 may make contact with at least one of the terminal plate 330 and the second electrode tab 225. Then, since one side of the third plate 530 has an acute corner, the acute corner portion of the third plate 530 may be driven into the terminal plate 330 or the second electrode tab 225 to be fixed to it or penetrate the terminal plate 330 or the second electrode tab 225 when the third plate 530 makes contact with the terminal plate 330 or the second electrode tab 225. Hence, when the short-circuit plate 500 makes contact with the terminal plate 330 or the second electrode tab 225, it is prevented from being separated from the terminal plate 330 or the second electrode tab 225, thereby consuming the power of the secondary battery further.

Although the embodiments of the present invention have been described in detail hereinabove, it should be understood that many variations and modifications of the basic inventive concept herein described will still fall within the spirit and scope of the present invention as defined in the appended claims.

What is claimed is:

1. A secondary battery comprising:
   an electrode assembly including a first electrode plate, a second electrode plate, and a separator disposed between the first and the second electrode plates;
   a can accommodating the electrode assembly, the can having a top opening on a top surface of the can; and
   a cap assembly covering the top opening of the can, the cap assembly including:
      a cap plate electrically connected to a first electrode tab protruding from the first electrode plate;
      an insulation plate located under the cap plate;
      a terminal plate located under the insulation plate;
      an electrode terminal penetrating the cap plate, the insulation plate, and the terminal plate and electrically connected to a second electrode tab protruding from the second electrode plate; and
      a short-circuit plate located under the cap plate within the can and surrounded by the electrode assembly, the can and the cap plate, the short-circuit plate being disposed in a manner that the short-circuit plate contacts the terminal plate or the second electrode tab whenever a distorting pressure is applied to the secondary battery.

2. The secondary battery of claim 1, wherein the short-circuit plate includes:
   a first plate contacting a bottom surface of the cap plate;
   a second plate connected to the first plate;
   a third plate connected to the second plate, the third plate being disposed under the terminal plate, the third plate contacting the terminal plate or the second electrode tab whenever a distorting pressure is applied to the secondary battery.

3. The secondary battery of claim 2, wherein a top surface of the third plate has a polygonal shape.

4. The secondary battery of claim 2, wherein a corner of the top surface of the third plate has an acute angle.

5. The secondary battery of claim 2, wherein the second plate maintains a first distance from the terminal plate.

6. The secondary battery of claim 5, wherein the first distance is about 1 mm to 3 mm.

7. The secondary battery of claim 2, wherein the third plate maintains a second distance from the terminal plate.

8. The secondary battery of claim 7, wherein the second distance is about 0.5 mm to 1.0 mm.

9. The secondary battery of claim 1, wherein the short-circuit plate is welded to the cap plate and is electrically connected to the cap plate.

10. The secondary battery of claim 1, wherein the short-circuit plate contacts the cap plate, and the terminal plate contacts the electrode terminal.

11. The secondary battery of claim 1, wherein the short-circuit plate is made of nickel or a nickel alloy.

12. The secondary battery of claim 1, wherein the cap assembly further comprising a gasket disposed inside a first hole of the cap plate, the electrode terminal penetrating the cap plate through the first hole and the gasket preventing the electrode terminal from contacting the cap plate.

13. A secondary battery comprising:
   an electrode assembly including a first electrode plate, a second electrode plate, and a separator disposed between the first and the second electrode plates;
   a can accommodating the electrode assembly, the can having a top opening on a top surface of the can; and
   a cap assembly covering the top opening of the can, the cap assembly including:
      a cap plate electrically connected to a first electrode tab protruding from the first electrode plate;
      an electrode terminal electrically connected to a second electrode tab protruding from the second electrode plate;
      a terminal plate electrically connected to the electrode terminal;
      an insulation plate disposed between the cap plate and the terminal plate; and
      a short-circuit plate located under the cap plate and contacting the cap plate within the can and surrounded by the electrode assembly, the can and the cap plate, the short-circuit plate being disposed in a manner that the short-circuit plate contacts the terminal plate or the second electrode tab whenever the can is distorted.

14. The secondary battery of claim 13, wherein the short-circuit plate includes:
   a first plate contacting a bottom surface of the cap plate;
   a third plate disposed under the terminal plate, the third plate contacting the terminal plate or the second electrode tab whenever a distorting pressure is applied to the secondary battery; and
   a second plate connecting the third plate to the first plate.

15. The secondary battery of claim 14, wherein the second plate maintains a first distance from the terminal plate.

16. The secondary battery of claim 14, wherein the third plate maintains a second distance from the terminal plate while the can is not distorted.

17. The secondary battery of claim 13, wherein the electrode terminal penetrates the cap plate, the insulation plate, and the terminal plate.

18. The secondary battery of claim 17, wherein the cap assembly further comprising a gasket disposed inside a first hole of the cap plate, the electrode terminal penetrating the cap plate through the first hole and the gasket preventing the electrode terminal from contacting the cap plate.

* * * * *